United States Patent [19]

Viscosi

[11] Patent Number: 4,653,222

[45] Date of Patent: Mar. 31, 1987

[54] INSECT SWATTER

[76] Inventor: Thomas N. Viscosi, 5643A Twining Ave., Otis Angs, Mass. 02542

[21] Appl. No.: 847,668

[22] Filed: Apr. 3, 1986

[51] Int. Cl.$^4$ .............................................. A01M 3/02
[52] U.S. Cl. ........................................................ 43/137
[58] Field of Search ................. 43/114, 115, 136, 137, 43/139, 134

[56] References Cited

U.S. PATENT DOCUMENTS

| | | | |
|---|---|---|---|
| D. 167,658 | 9/1952 | Roop | 43/137 |
| 1,083,179 | 12/1913 | Armstrong | 43/136 |
| 1,102,829 | 7/1914 | Walker | 43/115 |
| 1,888,563 | 11/1932 | Nixon | 43/136 |
| 2,326,845 | 8/1943 | Etzler | 43/136 |
| 3,449,856 | 6/1969 | Weaver | 43/136 |
| 3,798,828 | 3/1974 | Walti et al. | 43/137 |
| 4,279,095 | 7/1981 | Aasen | 43/139 |

Primary Examiner—M. Jordan
Attorney, Agent, or Firm—Richard L. Miller

[57] ABSTRACT

An insect swatter is provided and consists of a handle having an enlarged head portion with a raised lip around the perimeter of the head portion. A pair of pads of replaceable adhesive paper are each secured to both sides of the head portion to permit insects to adhere to the top sheets of the adhesive paper without the adhesive paper adhering to household surfaces and crushing the insects. A wall mounted poison holder is also provided to store the insect swatter when not in use.

2 Claims, 4 Drawing Figures

INSECT SWATTER

BACKGROUND OF THE INVENTION

The instant invention relates generally to insect killing devices and more specifically it relates to an insect swatter.

Numerous insect killing devices have been provided in prior art that are adapted to kill and hold insects thereto. For example U.S. Pat. Nos. 3,449,856; 3,798,828 and 3,984,937 all are illustrative of such prior art. While these units may be suitable for the particular purpose to which they address, they would not be as suitable for the purposes of the present invention as heretofore described.

SUMMARY OF THE INVENTION

A primary object of the present invention is to provide an insect swatter that will overcome the short comings of the prior art devices.

Another object is to provide an insect swatter that includes a swatting head having a raised lip around replaceable adhesive paper which will not leave insect blood and residue on walls and household surfaces and prevent insect residue from falling onto floors, carpets, etc.

An additional object is to provide an insect swatter that includes a wall mounted holder whereby when the insect swatter is inserted within the holder, messy insects are kept out of sight while struggling insects on the adhesive paper are killed by poison within the holder.

A further object is to provide an insect swatter that is simple and easy to use.

A still further object is to provide an insect swatter that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 1:
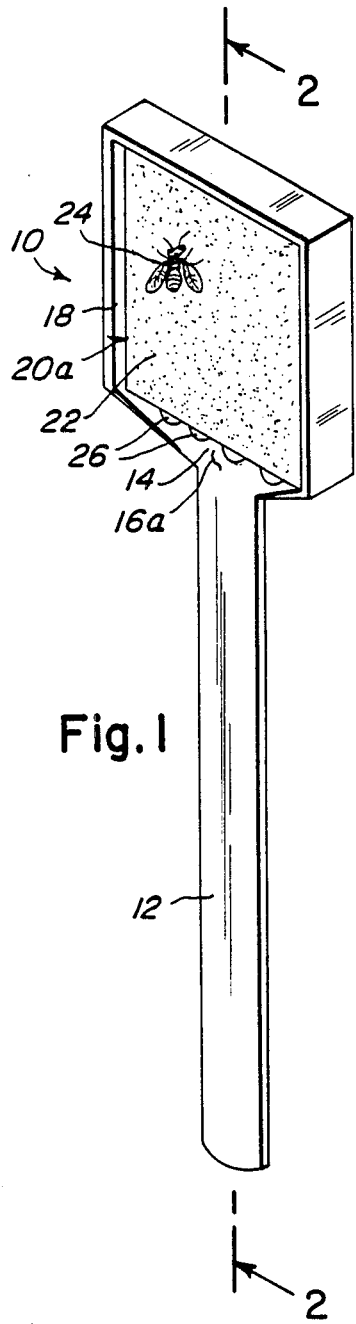
FIG. 1 is a perspective view of the invention.
Figure 2:
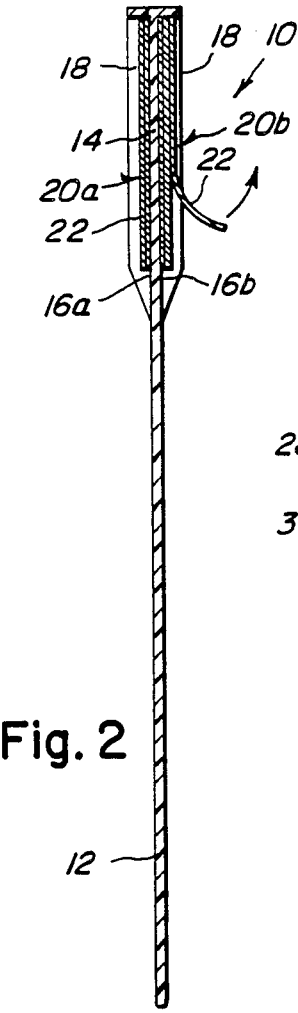
FIG. 2 is a cross sectional view taken along line 2—2 in FIG. 1.

Turning now descriptively to the drawings, in which similar reference characters denote similar elements throughout the several views, FIGS. 1 and 2 illustrate an insect swatter 10 that consists of a handle 12 of unitary construction terminating in an enlarged head portion 14 that has a substantially flat surface 16a and a raised lip 18 around perimeter of the enlarged head portion 14.

A pad 20a of replaceable adhesive paper 22 is secured to the flat surface 16a of the enlarged head portion 14 in which thickness of the lip 18 is sufficient to permit insects 24 to adhere to top sheet of the adhesive paper 22 without the adhesive paper adhering to household surfaces and crushing the insects 22.

The raised lip 18 extends to an around perimeter of opposite flat surface 16b of the enlarged head portion 14. A second pad 20b of replaceable adhesive paper 22 is secured to the opposite first surface 16b of the enlarged head portion 14 so that either side of the insect swatter 10 can be used for swatting the insects 24.

Each sheet of the adhesive paper 22 includes a non-adhesive tab 26 so that when the top sheet of the adhesive paper is cluttered with the insects 24, the top sheet can be removed by lifting the tab 26 to expose next sheet of the adhesive paper 22.

Figure 3:
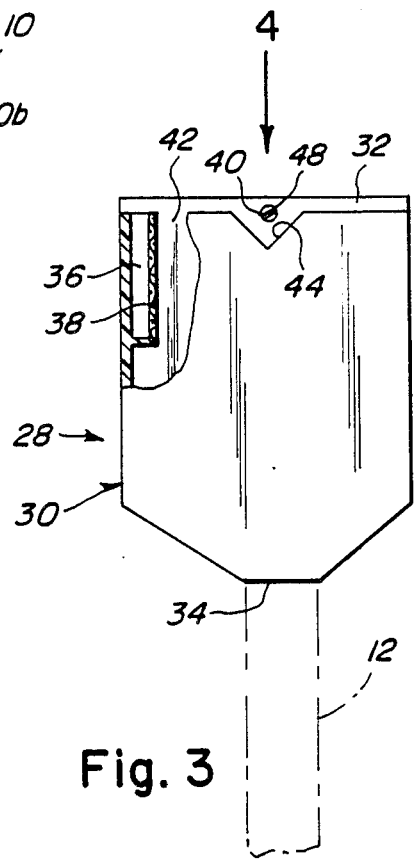
FIG. 3 is a front view of a holder for the insect swatter with parts broken away.
Figure 4:
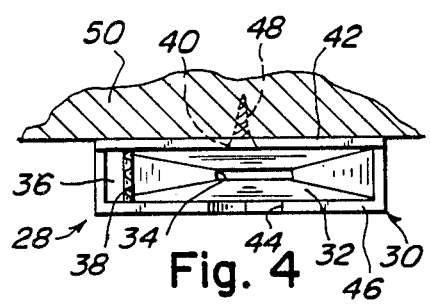
FIG. 4 is a top view taken in the direction as indicated by arrow in FIG. 3.

FIGS. 3 and 4 show a wall mounted holder 28 that includes a hollow sleeve 30 in a configuration generally in the shape of the enlarged head portion 14 and the lip 18. The sleeve 30 has a large open top end 32 and a small open bottom end 34 so that the handle 12 can be inserted within the sleeve 30 with the enlarged head portion 14 and lip 18 captured therein. A small compartment 36 is formed within the sleeve 30 and has a perforated internal wall 38 for holding poison material therein to kill any insects 24 still alive on the adhesive paper 22.

The sleeve 30 has an aperture 40 through a rear wall 42 near the large open top end 32 and a clearance notch 44 in front wall 46 opposite the aperture 40. A small screw 48 is inserted into the aperture 40 so that a screw driver (not shown) can be placed passed the clearance notch 44 to drive the screw 48 into a wall 50 for mounting the holder 28 thereto.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An insect swatter comprising:
   (a) a handle of unitary construction terminating in an enlarged head portion having a substantially flat surface and a raised lip around perimeter of said enlarged head portion; and
   (b) a pad of replaceable adhesive paper secured to said flat surface of said enlarged head portion in which thickness of said lip is sufficient to permit insects to adhere to top sheet of said adhesive paper without said adhesive paper adhering to household flat surfaces and crushing said insects, wherein said raised lip extends to and around perimeter of opposite flat surface of said enlarged head portion;
   (c) a second pad of replaceable adhesive paper secured to said opposite flat surface of said enlarged head portion so that either side of said insect swatter can be used for swatting said insects, wherein each sheet of said adhesive paper includes a non-adhesive tab so that when said top sheet of said adhesive paper is cluttered with said insects, said top sheet can be removed by lifting said tab to expose next sheet of said adhesive paper; and
   (d) a wall mounted holder that includes a hollow sleeve in a configuration generally in the shape of said enlarged head portion and said lip, said sleeve having a large open top end and a small open bottom end so that said handle can be inserted within said sleeve with said enlarged head portion and lip captured therein, wherein said holder further comprises a small compartment formed within said sleeve having a perforated internal wall for holding poison material therein to kill any insects still alive on said adhesive paper.

2. An insect swatter as recited in claim 1 wherein said holder further includes means for mounting said holder to a wall wherein said means comprises:
 (a) said sleeve having an an aperture through a rear wall near said large open top end and a clearance notch in front wall opposite said aperture; and
 (b) a small screw inserted in said aperture so that a screw driver can be placed passed said clearance notch to drive said screw into said wall.

* * * * *